US010241869B2

(12) United States Patent
Atia et al.

(10) Patent No.: US 10,241,869 B2
(45) Date of Patent: Mar. 26, 2019

(54) MANAGING A DELETION OF A VOLUME REFERENCED BY A SNAPSHOT OF A CONSISTENCY GROUP

(71) Applicant: INTERNATIONAL BUSINESS MACHINES CORPORATION, Armonk, NY (US)

(72) Inventors: Ohad Atia, Haifa (IL); Amalia Avraham, Petach Tikva (IL); Ran Harel, Kfar-Saba (IL); Alon Marx, Matan (IL)

(73) Assignee: International Business Machines Corporation, Armonk, NY (US)

( * ) Notice: Subject to any disclaimer, the term of this patent is extended or adjusted under 35 U.S.C. 154(b) by 37 days.

(21) Appl. No.: 15/452,852

(22) Filed: Mar. 8, 2017

(65) Prior Publication Data
US 2018/0260119 A1 Sep. 13, 2018

(51) Int. Cl.
*G06F 11/14* (2006.01)
*G06F 3/06* (2006.01)

(52) U.S. Cl.
CPC ........ *G06F 11/1446* (2013.01); *G06F 3/0604* (2013.01); *G06F 3/065* (2013.01); *G06F 3/067* (2013.01); *G06F 3/0644* (2013.01); *G06F 3/0652* (2013.01); *G06F 3/0673* (2013.01); *G06F 2201/84* (2013.01)

(58) Field of Classification Search
None
See application file for complete search history.

(56) References Cited

U.S. PATENT DOCUMENTS

| 7,694,088 | B1* | 4/2010 | Bromley | G06F 11/1458 |
| | | | | 711/162 |
| 8,407,435 | B2 | 3/2013 | Fienblit et al. | |
| 8,554,737 | B2 | 10/2013 | Jennas et al. | |
| 9,218,138 | B1 | 12/2015 | Haase et al. | |
| 9,225,527 | B1* | 12/2015 | Chang | H04L 9/3242 |
| 9,740,583 | B1* | 8/2017 | Brandwine | G06F 11/1448 |

(Continued)

FOREIGN PATENT DOCUMENTS

WO 2015081521 6/2015

OTHER PUBLICATIONS

Disclosed anonymously. (2014). System Monitoring in A Parallel Database Replication Apply Processing. IPCOM000234802D.

(Continued)

*Primary Examiner* — Sean D Rossiter
*Assistant Examiner* — Charles J Choi
(74) *Attorney, Agent, or Firm* — ZIP Group PLLC

(57) ABSTRACT

When a volume that was once associated with a consistency group and is to be deleted from the storage system, the to be deleted volume is designated as a ghost volume within the storage system, and the deletion of the ghost volume from the storage system is delayed until there are no snapshots that include a pointer to the ghost volume. The storage system may include a counter that counts the number of instances all volumes within a consistency group are pointed to or that counts the number of instances that only ghost volumes are pointed to. The storage system may reference this count to determine whether to immediately delete or delay the deletion of the volume from the storage system.

20 Claims, 11 Drawing Sheets

(56) References Cited

U.S. PATENT DOCUMENTS

| | | | |
|---|---|---|---|
| 2003/0101321 A1* | 5/2003 | Ohran | G06F 11/1451 711/162 |
| 2008/0059541 A1* | 3/2008 | Fachan | G06F 17/30088 |
| 2011/0145483 A1* | 6/2011 | Sudo | G06F 12/0246 711/103 |
| 2015/0089171 A1 | 3/2015 | Fujita et al. | |
| 2015/0286425 A1 | 10/2015 | Dain et al. | |
| 2015/0301906 A1 | 10/2015 | Crockett et al. | |

OTHER PUBLICATIONS

Natanzon, A., & Bachmat, E. (2013). Dynamic Synchronous/Asynchronous Replication. ACM Transactions on Storage (TOS), 9(3), 8.

* cited by examiner

400

402 403 404 406 407 408 410

| Current Con-Group ID | Past Con-Group ID | Volume ID | To Be Deleted? | Ghost? | Snapped Volume (SV) Count | SV ID(s) |
|---|---|---|---|---|---|---|
| null | CG: 1a23x7 | Vol #: 3,920,302 | Y | Y | 2 | R1732a R2934d |
| CG: 1a23x7 | null | Vol #: 3,920,303 | N | N | 3 | R1732a R2934d R5032z |

FIG. 8

MANAGING A DELETION OF A VOLUME REFERENCED BY A SNAPSHOT OF A CONSISTENCY GROUP

FIELD OF THE INVENTION

Embodiments of the invention generally relate to computer systems and more particularly to a storage system that manages the deletion of a volume that is referenced by a snapshot of a consistency group.

DESCRIPTION OF THE RELATED ART

A consistency group is a logical grouping of storage volumes that when a snapshot is taken thereof, the snapshot of each of the volumes is at the same point-in-time.

Snapshots are a common way to protect data within a storage system. A snapshot of the consistency group is generally the state of the consistency group at a particular point in time. More specifically, a snapshot of a consistency group is a set of pointers, or a set of pointers and associated meta-data, to denote the data stored within the volumes of the consistency group.

Snapshots generally depend entirely on the reliability of the source consistency group. This means that in case of a disaster or damage to the source data of the consistency group's volumes, the snapshot will be lost or inaccessible. Typically, there has been no way to restore data from a snapshot if the source data of the consistency group's volumes is lost or deleted.

A consistency group volume may be deleted from the storage system in a variety of situations. For example, the volume may be deleted if the volume is associated with a test virtual machine that is no longer required, if the volume is associated with a virtual machine and an application or user of the virtual machine believes the volume to be redundant, or if the volume is deleted from the storage system by mistake.

As time passes, a user may want to restore an application to a state it was in several hours or days ago, using a consistency group snapshot. If in the interim, however, a volume that was once apart of the consistency group has been deleted, the preexisting snapshot of that consistency group with be a partial snapshot, since the pointer to the deleted volume will have also been deleted. As such, a user would not be able to restore the application to the state it was in several hours or days ago, using this partial snapshot.

SUMMARY

In an embodiment of the present invention, a method of managing point-in-time snapshots of a consistency group that include a plurality of original volumes is presented. The method includes designating an original volume as a ghost volume within a storage system. The method further includes identifying a preexisting point-in-time snapshot of a consistency group that existed prior to the designation of the ghost volume. The preexisting point-in-time snapshot, subsequent to the designation of the ghost volume, consists of a plurality of pointers that each point to one of the plurality of original volumes and an orphaned pointer that points to the ghost volume. The method further includes, subsequent to the designation of the ghost volume, taking a present point-in-time snapshot of the consistency group. The present point-in-time snapshot consists of a plurality of pointers that each point to one of the plurality of original volumes. The method further includes preventing deletion of the ghost volume from the storage system until there are no point-in-time snapshots of the consistency group that comprise a orphaned pointer that points to the ghost volume.

In another embodiment of the present invention a computer program product for managing point-in-time snapshots of a consistency group that includes a plurality of original volumes is presented. The computer program product includes a computer readable storage medium having program instructions embodied therewith. The program instructions are readable by a storage system to cause the storage system to designate an original volume as a ghost volume within the storage system. The program instructions are also readable by the storage system to cause the storage system to identify a preexisting point-in-time snapshot of a consistency group that existed prior to the designation of the ghost volume. The preexisting point-in-time snapshot, subsequent to the designation of the ghost volume, consists of a plurality of pointers that each point to one of the plurality of original volumes and an orphaned pointer that points to the ghost volume. The program instructions are also readable by the storage system to cause the storage system to, subsequent to the designation of the ghost volume, take a present point-in-time snapshot of the consistency group. The present point-in-time snapshot consists of a plurality of pointers that each point to one of the plurality of original volumes. The program instructions are also readable by the storage system to cause the storage system to prevent deletion of the ghost volume from the storage system until there are no point-in-time snapshots of the consistency group that include a orphaned pointer that points to the ghost volume.

In yet another embodiment of the present invention, a storage system is presented. The storage system includes a consistency group repository that includes a consistency group that includes a plurality of original volumes and a designated ghost volume associated with the consistency group. The storage system also includes a snapshot repository. The snapshot repository includes a first point-in-time snapshot of the consistency group taken prior to the designation of the ghost volume. The first point-in-time snapshot consists of a first plurality of pointers that each point to one of the plurality of original volumes and an orphaned pointer that points to the ghost volume. The snapshot repository also includes a second point-in-time snapshot of the consistency group taken subsequent to the designation of the ghost volume. The second point-in-time snapshot consists of a second plurality of pointers that each point to one of the plurality of original volumes. The storage system also includes a snapshot manager stored upon a computer readable storage medium within the storage system that when called by the storage system, causes the storage system to prevent deletion of the ghost volume from the storage system until there are no point-in-time snapshots of the consistency group that comprise a orphaned pointer that points to the ghost volume.

These and other embodiments, features, aspects, and advantages will become better understood with reference to the following description, appended claims, and accompanying drawings.

BRIEF DESCRIPTION OF THE DRAWINGS

FIG. 8 illustrates an exemplary table that tracks a count of the number of snapshots that contain a pointer to one or more volumes within a consistency group, according to various embodiments of the present invention.

DETAILED DESCRIPTION

In a storage system, when a volume that is currently or was once associated with a consistency group and is to be deleted from the storage system, the to be deleted volume is designated as a ghost volume within the storage system, and the deletion of the ghost volume from the storage system is delayed until there are no snapshots that include a pointer to the ghost volume. The storage system may include a counter that counts the number of instances all volumes within a consistency group are pointed to or that counts the number of instances that only ghost volumes are pointed to. The storage system may reference this count to determine whether to immediately delete or delay the deletion of the volume from the storage system.

Figure 1:
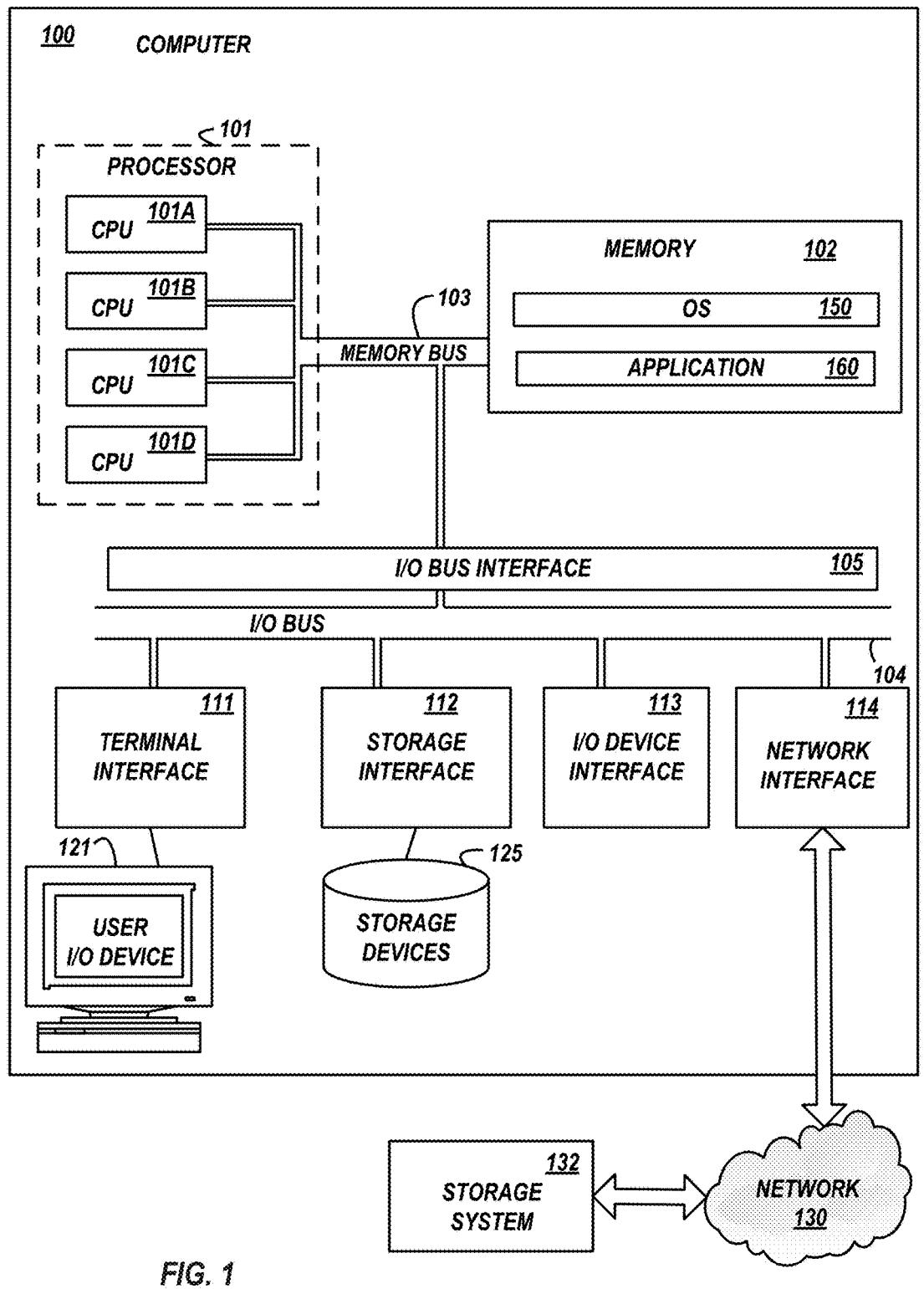
FIG. 1 illustrates a high-level block diagram of an exemplary data handling system, according to various embodiments of the invention.

Referring to the Drawings, wherein like numbers denote like parts throughout the several views, FIG. 1 depicts a high-level block diagram representation of a data handling system of a computer 100 connected to a storage system 132 via a network 130. The term "computer" is used herein for convenience only, and in various embodiments, is a more general data handling device. The mechanisms and apparatus of embodiments of the present invention apply equally to any appropriate data handling device.

Computer 100 may include one or more processors 101, a main memory 102, a terminal interface 111, a storage interface 112, an I/O (Input/Output) device interface 113, and/or a network interface 114, all of which are communicatively coupled, directly or indirectly, for inter-component communication via a memory bus 103, an I/O bus 104, and an I/O bus interface unit 105. The computer 100 contains one or more general-purpose programmable central processing units (CPUs) 101A, 101B, 101C, and 101D, herein generically referred to as the processor 101. In an embodiment, the computer 100 contains multiple processors typical of a relatively large system; however, in another embodiment the computer 100 may alternatively be a single CPU system. Each processor 101 executes instructions stored in the main memory 102 and may comprise one or more levels of on-board cache.

In an embodiment, the main memory 102 may comprise a random-access semiconductor memory, storage device, or storage medium for storing or encoding data and programs. In another embodiment, the main memory 102 represents the entire virtual memory of the computer 100, and may also include the virtual memory of other computer systems coupled to the computer 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes an operating system 150 and one or more applications 160. Although the operating system 150, application 160, etc. are illustrated as being contained within the memory 102 in the computer 100, in other embodiments some or all of them may be on different computer systems and may be accessed remotely, e.g., via a network. The computer 100 may use virtual addressing mechanisms that allow the programs of the computer 100 to behave as if they only have access to a large, single storage entity instead of access to multiple, smaller storage entities.

Thus, while operating system 150 and application 160 are illustrated as being contained within the main memory 102, these elements are not necessarily all completely contained in the same memory at the same time. Further, although operating system 150 and application 160 are illustrated as being separate entities, in other embodiments some of them, portions of some of them, or all of them may be packaged together.

In an embodiment, operating system 150 and application 160 comprise program instructions or statements that are called and executed by the processor 101 or instructions or statements that are interpreted by instructions or statements that execute on the processor 101, to carry out the functions as further described below with reference to FIGS.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The I/O interface units support communication with a variety of storage devices and/or other I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer 100, and may receive output data via the user output devices. For example, a user interface may be presented via the user I/O device 121, such as displayed on a display device, played via a speaker, or printed via a printer.

The storage interface unit 112 supports the attachment of one or more storage devices 125. In an embodiment, the storage devices 125 are rotating magnetic disk drive storage devices, but in other embodiments they are arrays of disk drives configured to appear as a single large storage device to a host computer, or any other type of storage device. The contents of the main memory 102, or any portion thereof, may be stored to and retrieved from the storage device 125, as needed. The local storage devices 125 have a slower access time than does the memory 102, meaning that the time needed to read and/or write data from/to the memory 102 is less than the time needed to read and/or write data from/to for the local storage devices 125.

The I/O device interface unit 113 provides an interface to any of various other input/output devices or devices of other types, such as printers or fax machines. The network interface unit 114 provides one or more communications paths from the computer 100 to other data handling devices, such as storage system 132; such paths may comprise, e.g., one or more networks 130. Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 105 and the I/O bus 104 are shown as single respective units, the computer 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

I/O interface unit(s) may contain electronic components and logic to adapt or convert data of one protocol on I/O bus 104 to another protocol on another bus. Therefore, network interface 114 may connect a wide variety of devices to computer 100 and to each other such as, but not limited to, tape drives, optical drives, printers, disk controllers, workstations using one or more protocols including, but not limited to, Token Ring, Gigabyte Ethernet, Ethernet, Fibre Channel, SSA, Fiber Channel Arbitrated Loop (FCAL), Serial SCSI, Ultra3 SCSI, Infiniband, FDDI, ATM, 1394, ESCON, wireless relays, Twinax, LAN connections, WAN connections, high performance graphics, etc.

Though shown as distinct entities, the multiple I/O interface units 111, 112, 113, and 114 or the functionality of the I/O interface units 111, 112, 113, and 114 may be integrated into the same device.

In various embodiments, the computer 100 is a multi-user mainframe computer system, a single-user system, a storage server, or a server computer or similar device that has little or no direct user interface, but receives requests from other computer systems (clients). In other embodiments, the computer 100 is implemented as a desktop computer, portable computer, laptop or notebook computer, tablet computer, pocket computer, telephone, smart phone, pager, automobile, teleconferencing system, appliance, or any other appropriate type of electronic device.

A communication network may connect the computer 100 to another data handling device and be any suitable communication network or combination of networks and may support any appropriate protocol suitable for communication of data and/or code to/from the computer 100. In various embodiments, the communication network may represent a data handling device or a combination of data handling devices, either connected directly or indirectly to the computer 100. In another embodiment, the communication network may support wireless communications. In another embodiment, the communication network may support hard-wired communications, such as a telephone line or cable. In another embodiment, the communication network may be the Internet and may support IP (Internet Protocol). In another embodiment, the communication network is implemented as a local area network (LAN) or a wide area network (WAN). In another embodiment, the communication network is implemented as a hotspot service provider network. In another embodiment, the communication network is implemented an intranet. In another embodiment, the communication network is implemented as any appropriate cellular data network, cell-based radio network technology, or wireless network. In another embodiment, the communication network is implemented as any suitable network or combination of networks.

Network 130 which connects computer 100 and storage device 132 is a storage area network (SAN), which is a network which provides access to consolidated, block level data storage. Network 130 is generally any high-performance network whose primary purpose is to enable storage system 132 to provide block level storage operations to computer 100. Network 130 may be primarily used to enhance storage devices, such as disk arrays, tape libraries, optical jukeboxes, etc., within the storage system 132 to be accessible to computer 100 so that storage devices within storage system 132 appear to the operating system 150 of computer 100 as locally attached devices. In other words, the storage system 132 may appear to the OS 150 as being storage device 125. A benefit of network 130 is that raw storage of storage system 132 may be treated as a pool of resources that can be centrally managed and allocated on an as-needed basis. Further, network 130 may be highly scalable because additional storage capacity can be added to storage system 132, as required.

In an embodiment, the storage system 132 may comprise some or all of the elements of the computer 100 and/or additional elements not included in computer 100. For example, storage system 132 may include multiple storage units with each storage unit including a local processor 101, local memory 102, and local one or more storage devices. Application 160 and/or OS 150 of multiple computers 100 can be connected to multiple storage units of the storage systems 132, via the network 130. For example, any application 160 and or OS 150 running on each computer 100 can access shared or distinct block level storage within storage system 132. When computer 100 wants to access a storage device within storage system 132 via the network 130, computer 100 sends out a block-based access request for the storage device. Network 130 may further include cabling, host bus adapters (HBAs), and switches. Each switch and storage system 132 on the network 130 may be interconnected and the interconnections generally support bandwidth levels that can adequately handle peak data activities. Network 130 may be a Fibre Channel SAN, iSCSI SAN, or the like.

FIG. 1 is intended to depict representative major components of the computer 100. Individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program instructions implementing e.g. upon computer system 100 according to various embodiments of the invention may be implemented in a number of manners, including using various computer applications, routines, components, programs, objects, modules, data structures, etc., and are referred to hereinafter as "computer programs," or simply "programs."

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
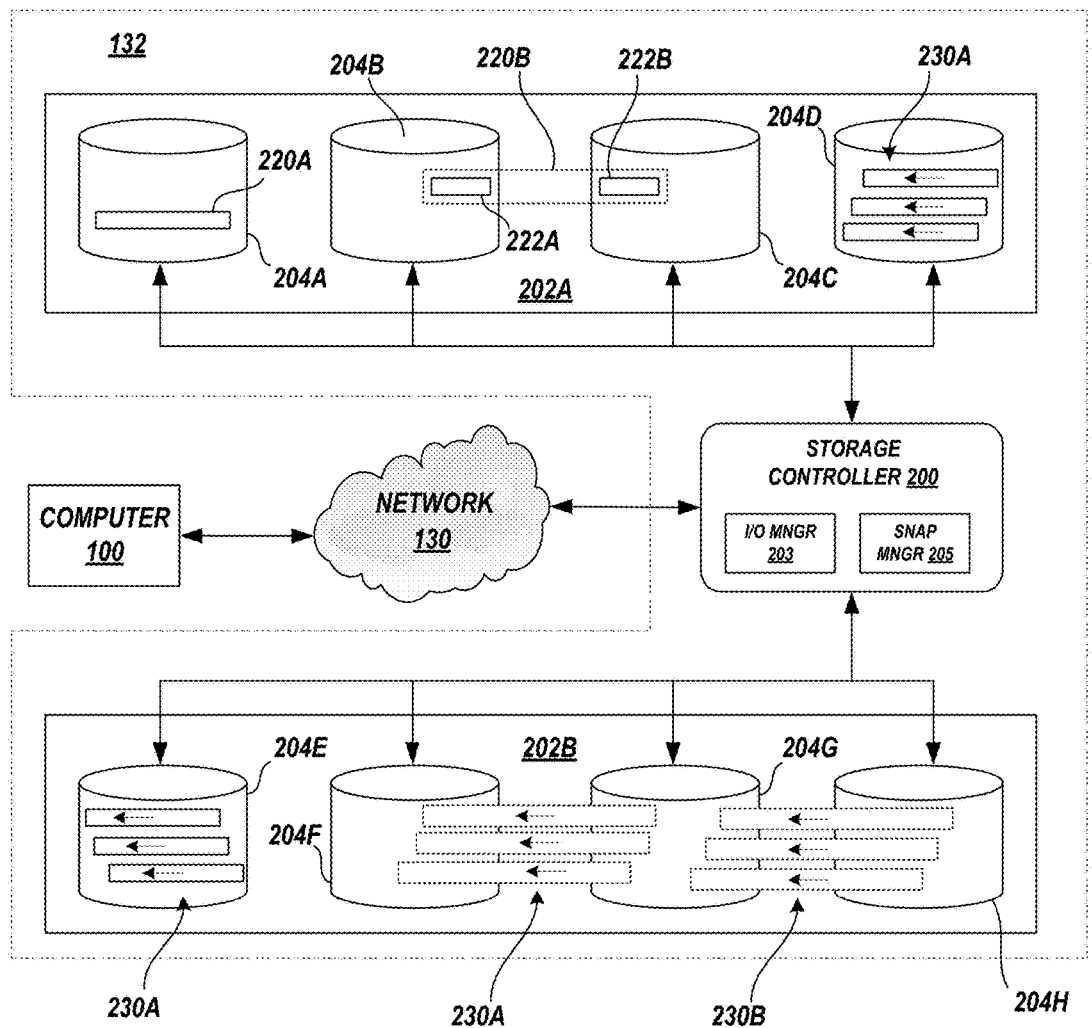
FIG. 2 illustrates an exemplary storage system, according to various embodiments of the invention.

Referring to FIG. 2 that illustrates an exemplary storage system 132 that includes storage unit 202A, storage unit 202B, and storage controller 200. Storage controller 200 is a device that is logically located between computer 100 and storage devices 204 local to (i.e. within) its storage unit 202, that presents itself to computer 100 as a storage provider (target), and presents itself to each storage device 204 as one big host (initiator). Controller 200 is communicatively attached to one or several networks 130.

In certain embodiments, the storage controller 200 may comprise some or all of the elements of the computer 100. For example, storage controller 200 may be a controlling hardware node within a multi-node storage system 132. The controlling node is a specific data handling device, such as a server, blade, etc. which may include some or all of the elements of the computer 100. In such embodiment, storage unit 202A and storage unit 202B may be distinct hardware nodes in the multi-node storage system 132 and may each locally comprise some or all of the elements of the computer 100.

In other embodiments, storage controller 200, storage unit 202A, and storage unit 202B may be integrated into a single hardware node. In these embodiments, the storage controller 200 may be a component e.g. processor 101, application specific integrated circuit (ASIC), or the like, that is connected to storage devices 204 of storage unit 202A and storage unit 202B via e.g., memory bus 103, I/O bus 104, etc. of storage system 132.

In yet other embodiments, storage controller 200 may be a controlling hardware node within a network 130 connected multi-node storage system 132. In such embodiment, storage controller 200, storage unit 202A, and storage unit 202B may be distinct hardware nodes in the multi-node storage system 132 and are connected by network 130 and may each locally comprise some or all of the elements of the computer 100.

Storage device 204 is a device for storing data. Specific examples of a storage device 204 may be a magnetic storage device, optical storage device, or an electrical storage device. A magnetic storage device may be a magnetic tape device, drum memory device, floppy disk drive, etc. An optical storage device may be an optical jukebox, optical disk, disk drive, etc. An electrical storage device may be a semiconductor device used in volatile random-access memory, flash memory device, solid state storage device, etc.

When storage devices 204 and storage controller 200 are located in the same hardware node, storage devices 204 may be communicatively connected to the storage controller 200 via a memory bus 103, I/O bus 104, etc. of storage system 132. Alternatively, when storage controller 200 is a controlling node within a multi-node storage system 132, storage devices 204 may be located in a node, which may be referred to as storage unit 202 of the multi-node storage system 132. In this embodiment, each storage unit 202 is a unique data handling device, such as a server, blade, etc. which may include some or all of the elements of the computer 100 and local storage devices 204. A particular storage system 132 may include a single controlling node and multiple storage nodes with each node being communicatively connected to all other nodes. In embodiments, multiple storage devices 204 may be included within a storage array within storage system 132, such as a RAID array, or the like. The array is essentially multiple devices 204 that enables the distribution of data across the multiple storage devices 204, provides fault tolerance through redundant devices, as is known in the art. Storage devices 204 may be the same storage devices as storage devices 125.

One or more nodes of storage system 130 may include an I/O manager 203 and a snapshot manager 205. For example, as depicted, storage controller 200 may include I/O manager 203 and a snapshot manager 205. I/O manager 203 and snapshot manager 205 are one or more applications stored within and called and executed by storage controller 200.

I/O manager 203 conducts block I/O as is known in the art. During a write to storage system 132, I/O manager 203 receives a block(s) and associated logical block address(es) (LBA) from operating system 150 and/or application 160 of computer 100 and writes the block(s) to one or more volumes within storage devices 204. The term volume as utilized herein is defined as a single accessible storage area within a storage device 204 within storage system 132. The volume in which the data that is initially stored within storage device 204 as a result of a write request from computer 100 is herein referred to as an original volume 220. The original volume 220 may be logically within a single device 204. For example, original volume 220A is located within a single device 204A. Alternatively, the original volume 220 may be located across multiple devices 204. For example, original volume 220B is located upon device 204B and upon device 204C such that a portion 222A of the original volume 220B is located within device 204B and a portion 222B of the original volume 220B is located on device 204C.

During a read from storage system 132, I/O manager 203 receives the LBA from operating system 150 and/or application 160 of computer 100 retrieves the data at the one or more volumes of the storage devices 204 associated with the LBA and returns the retrieved data to the requesting operating system 150 and/or application 160 of computer 100. For example, I/O manager 203 may retrieve a block within original volume 220A from device 204A and return the block to the requesting operating system 150 and/or application 160 of computer 100.

Snapshot manager 205 controls taking snapshots of data within original volume 220 within storage system 132. More specifically, snapshot manager 205 controls and takes consistent point-in-time snapshots of an original volume 220 by creating and storing respective pointers that each point to the data and/or other meta-data associated to the data within each original volume 220 of the consistency group within the snapshot within storage system 132. Various techniques for creation of pointers and/or meta-data within a point-in-time snapshot are generally known in the art.

For example, snapshot manager 205 controls and takes point-in-time snapshots of original volume 220A at different times and stores the various point-in-time snapshots as pointers 230A to one or more storage devices 204 in storage system 132. The pointers 230A may be solely a pointer that points to original volume 220A or may be a pointer that points to original volume 220A and other meta-data that is associated with the original volume 220A.

The pointer 230A may be stored in a storage device 204A in the same storage unit 202A as the storage device 204A as the original volume 220A. Alternatively, the pointer 230A may be stored in a storage device 204E in a different storage unit 202B relative to storage unit 202A that which contains storage device 204A that stores the original volume 220A. The pointer 230A may be stored in a single storage device 204, such as storage device 204A, 204E, or the like. Alternatively, the pointer 230A may be stored to multiple devices 204F, 204G such that a portion of the pointer 230A is stored upon device 204F and a portion of the pointer 230A is stored on device 204G.

Similarly, snapshot manager 205 controls and takes point-in-time snapshots of original volume 220B at different times and stores the various point-in-time snapshots as pointers 230B to one or more storage devices 204 in storage system 132. The pointers 230B may be solely a pointer that points to original volume 220B or may be a pointer that points to original volume 220B and other meta-data that is associated with the original volume 220B. The pointer 230B may be stored in a storage device 204A in the same storage unit 202A as the storage device 204A as the original volume 220B. Alternatively, the pointer 230B may be stored in a storage device 204E in a different storage unit 202B relative to storage unit 202A that which contains storage device 204A that stores the original volume 220B. The pointer 230B may be stored in a single storage device 204, such as storage device 204A, 204E, or the like. Alternatively, the pointer 230B may be stored to multiple devices 204F, 204G such that a portion of the pointer 230B is stored upon device 204F and a portion of the pointer 230B is stored on device 204G.

Snapshot manager 205 may take multiple sequential point-in-time snapshots of the same original volume 220A, 220B and store the sequential point-in-time snapshot instances as sequential snapshot 230A, 230B instances to one or more storage devices 204 within system 132.

As is further described herein, snapshot manager 205 delays or prevents the deletion of a volume, that was previously associated with a consistency group that which a snapshot was taken thereof, from the storage system 132 until there are no snapshots that contain a pointer to the to-be deleted volume. Snapshot manager 205 designates the to-be deleted volume as a ghost volume within the storage system 132. Snapshot manager 205 then delays the deletion of the ghost volume from the storage system 132 until there are no snapshots that include a pointer to the ghost volume. Snapshot manager 205 may include a counter that counts the number of instances every volume is pointed to by snapshot (s) of the consistency group. Snapshot manager 205 may alternatively include a counter that counts the number of instances the ghost volume is pointed to by snapshot(s) of the consistency group. In these implementations, snapshot manager 205 may reference this count to allow the immediate deletion or prevent/delay the deletion of the volume from the storage system 132.

During a restore operation from storage system 132, snapshot manager 205 receives a request from operating system 150 and/or application 160 of computer 100 to restore or recover data that is pointed to by a snapshot and retrieves the pointed to data from the associated storage device(s) 204 and returns the pointed to data the requesting operating system 150 and/or application 160 of computer 100.

Figure 3:
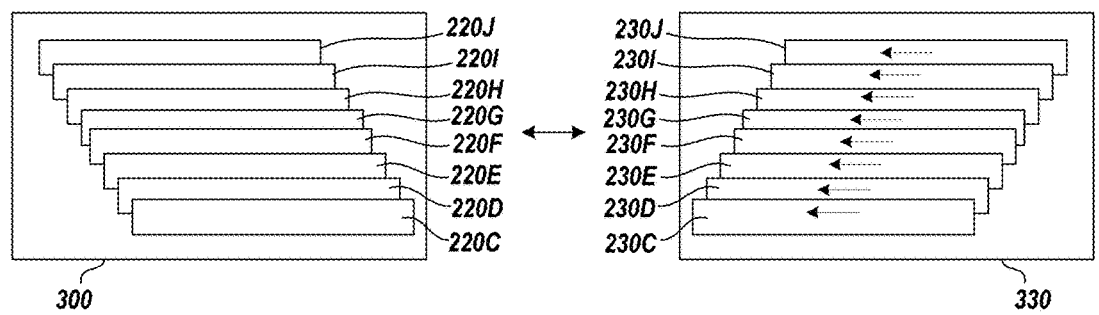
FIG. 3 illustrates a consistency group and a point-in-time snapshot thereof, according to various embodiments of the present invention.

FIG. 3 illustrates a consistency group 300 and a point-in-time snapshot 330 of the consistency group 300. Consistency group 300 is a logical grouping of original volumes 220. Consistency group 300 is a logical grouping of volumes 220 that when a snapshot 330 is taken thereof, the snapshot 330 of each of the volumes 220 is at the same point-in-time. Snapshot 330 of the consistency group 300 is a data structure that generally describes the state of the consistency group 300 at a particular point in time. More specifically, snapshot 330 of consistency group 300 is a set of pointers, or a set of pointers and associated meta-data, to denote the data stored within the volumes 220 of the consistency group 300.

For example, as is shown in FIG. 3, consistency group 300 includes original volumes 220C-220J. Snapshot manager 205 creates and stores a collective set of pointers 230C-230J that each respectively point to volumes 220C-220J as snapshot 330 within a snapshot repository within storage system 132. A pointer 230 is a pointer that points to data within the pointed to volume 220 or is a pointer that points to data within the pointed to volume 220 and associated meta-data. Snapshot 330 is a consistent set of pointers 230C-230J and is associated with a particular point-in-time that the snapshot 330 was taken. For clarity, consistency group 300 that which includes original volumes 220 may be referred herein as an original consistency group.

The one or more pointers 230 within point-in-time snapshot 330 point to their associated original volumes 220 as is known in the art. For example, pointer 230C points to original volume 220C, pointer 230D points to original volume 220D, pointer 230E points to original volume 220E, pointer 230F points to original volume 220F, pointer 230G points to original volume 220G, pointer 230H points to original volume 220H, pointer 230I points to original volume 220I, and pointer 230J points to original volume 220J.

The snapshot 330 may be stored in a storage device 204 in the same storage unit 202 as the storage device 204 that contains the consistency group 300. Alternatively, the snapshot 330 may be stored in a storage device 204 in a different storage unit 202 relative to the storage unit 202 that which contains the consistency group 300. For example, the snapshot 330 may be stored in a storage unit 202 that is connected to the storage unit 202 that which contains the consistency group 300 by network 130. In another implementation, the snapshot 330 may be stored in a storage unit 202 that is connected to the storage unit 202 that which contains the consistency group 300 by a cable. The snapshot 330 may be stored in a single storage device 204. Alternatively, the snapshot 330 may be stored multiple devices 204 such that a portion of the snapshot 330 is stored upon a first device 204 and a portion of the snapshot 330 is stored on a second device 204.

Figure 4:
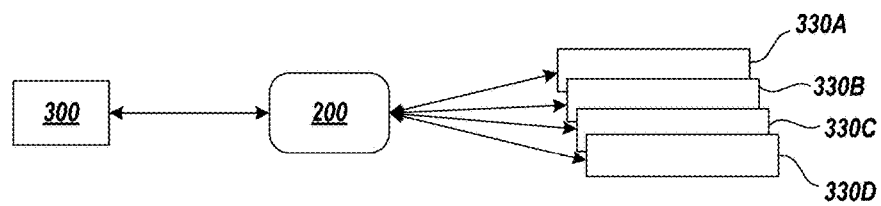
FIG. 4 illustrates multiple point-in-time snapshots of a single consistency group, according to various embodiments of the present invention.

FIG. 4 illustrates multiple point-in-time snapshots 330A-330D of a single consistency group 300. Snapshot manager 205 may take snapshots 330 of the consistency group 300 at sequential, various, or generally different points-in-time. As such, multiple snapshots 330 of the same consistency group 300 may exist within storage system 132. For example, snapshot manager 205 may conduct a snapshot of consistency group 300 every morning at 1:00 a.m. As such, during each snapshot operation a new point-in-time snapshot 330 is created and stored within system 132. For example, after a first snapshot operation at a first time instance, snapshot 330A of consistency group 300 is created and stored in storage system 132, after a second snapshot operation at a second subsequent time instance, snapshot 330B of consistency group 300 is created and stored in storage system 132, after a third snapshot operation at a third subsequent time instance, snapshot 330C of consistency group 300 is created and stored in storage system 132, and after a fourth snapshot operation at a fourth subsequent time instance, snapshot 330D of consistency group 300 is created and stored in storage system 132.

The snapshot 330A may be stored in a storage device 204 in the same storage unit 202 as the storage device 204 that contains the snapshot 330B or snapshot 330B 330C, or the like. Alternatively, the snapshot 330A may be stored in a different storage device 204 relative to storage device 204 that contains the snapshot 330B or snapshot 330D, in the same or different storage units 202, or the like. For example, the snapshot 330A may be stored in a storage unit 202 that is connected by network 130 to the storage unit 202 that which contains the snapshot 330B or snapshot 330C, or the like. For clarity, the storage device 204, storage devices 204, or portion of the storage device(s) 204 within storage system 132 that which store snapshots 330 may be referred herein as a snapshot repository. Likewise, the storage device 204, storage devices 204, or portion of the storage device(s) 204 within storage system 132 that which store consistency groups 300 may be referred herein as a consistency group repository. The consistency group repository may be the same or different storage area relative to the snapshot repository.

Figure 5:
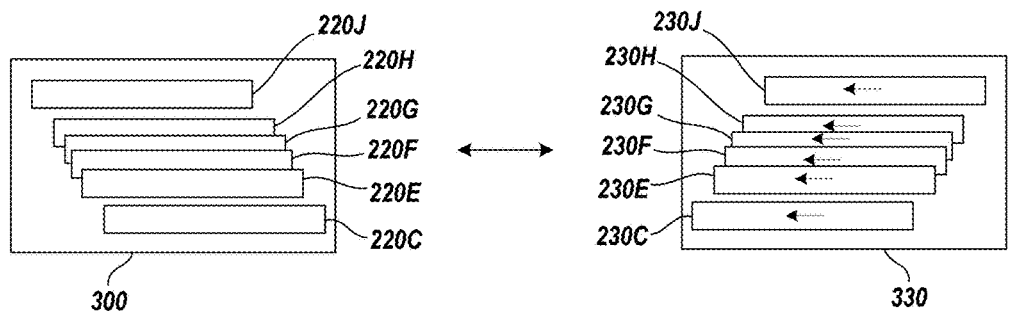
FIG. 5 illustrates volumes within a consistency group being deleted and associated snapshot pointers being deleted from a point-in-time snapshot of the consistency group, according to various embodiments of the present invention.

FIG. 5 illustrates a particular snapshot management scheme that results in deletion of pointer 230D and pointer 230I as a result of the deletion of original volume 220D and the deletion of original volume 220I from storage system 132. Upon when original volume 220 is deleted from the storage system 132, each pointer 230 that points to the deleted volume 220 is resulting deleted from each preexisting snapshot 330, rendering these snapshots 330 unusable. As such, snapshot manager 205 would not be able to restore data utilizing those partial snapshots 330 as one or more of the pointers 230 have been deleted. Therefore, it is an object of the embodiments of the present invention, for snapshot manager 205 to delay or prevent the deletion of an original volume 220 from the storage system 132 until there are no snapshots 330 that contains a pointer 230 that points to the to-be deleted volume.

In some embodiments, the snapshot manager 205 may remove the to-be deleted volume 230 from any consistency group that it is contained. The term removal of a to-be deleted volume from a consistency group, or the like, is defined herein as the logical exclusion of the to-be deleted volume from the consistency group such that (1) the to-be deleted volume is not snapped in future point-in-time snapshot of the consistency group, and (2) is hidden from and not provided to a requesting computer when the computer reads the consistency group. In some implementations, the removal of the to-be delegated volume means changing the logical definition of the consistency group 300 to exclude the to-be deleted from the consistency group.

A particular original volume 220 that is to-be deleted from storage system 132 may be associated with one or more consistency groups 300A and 300B. For example, original volume 220 may be presently included within consistency groups 300A and 300B. Alternatively, original volume 220 may have been previously included within consistency groups 300A and 300B but is presently not included within consistency groups 300A and 300B. For example, volume 220 may first reside in consistency group 300A and various snapshots 330 thereof may exist within snapshot repository. The volume 220 may subsequently be moved to consistency group 300B and various snapshots 330 thereof may also exist within snapshot repository. The volume 220 may then be removed from consistency group 300 B. At a particular point in time, the volume 220 is to-be deleted from storage system 132. As such, the deletion of the volume 220 is delayed until there are no snapshots 330 (either snapshots 330 of consistency group 300A or snapshots 330 of consistency group 300B) that contain a pointer 230 that points to the to-be deleted volume 220.

Figure 6:
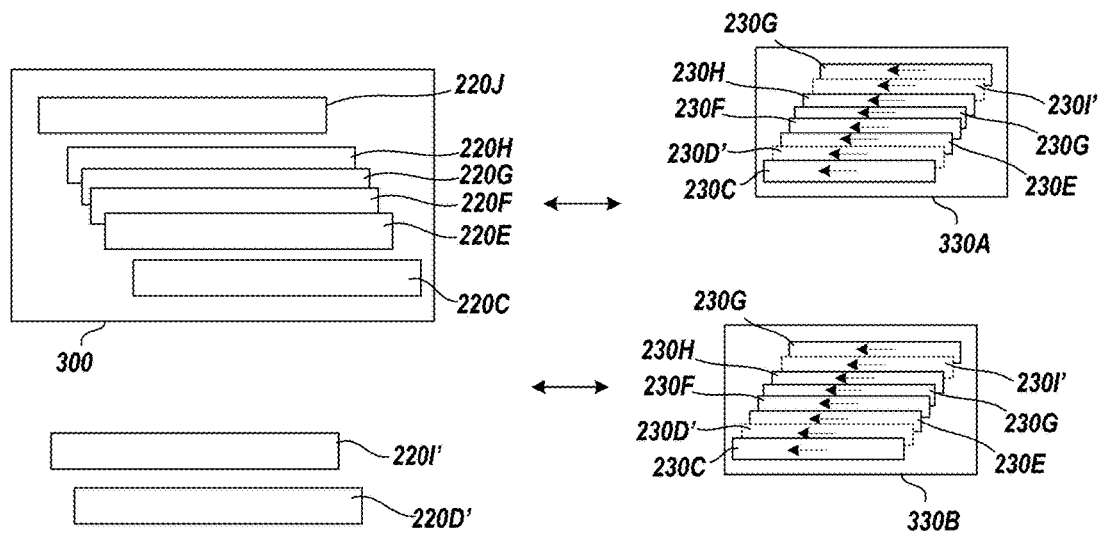
FIG. 6 illustrates ghost volumes within the storage system that are designated to be deleted and associated orphan pointers within previous point-in-time snapshot of the consistency group, according to various embodiments of the present invention.

FIG. 6 illustrates the creation of a ghost volume within storage system 132 as a result of original volume 220 associated therewith being designated to-be deleted from storage system 132 and the resulting creation of an orphan pointer within a snapshot 330 of a consistency group 300 that includes a pointer 230 points to the ghost volume.

To achieve the aforementioned objects of the embodiments of the present invention, upon receipt of an instruction to delete an original volume 220 from storage system 132, snapshot manager 205 delays the deletion of the to be deleted volume from storage system 132 until there are no snapshots 330 that contain a pointer 230 that points to the to be deleted volume. Such object is achieved by snapshot manager 205 designating the to-be deleted volume as a ghost volume.

A ghost volume is defined herein to be (1) a to-be deleted volume from the storage system, (2) that is or was associated with consistency group(s) that which snapshots exist within storage system that contain a pointer that points to the to-be deleted volume, (3) is not deleted from the storage system until there are no point-in-time snapshots within the storage system that contain a pointer that points to the to-be deleted volume, (4) subsequent it's designation as a ghost volume is not snapped in future point-in-time snapshots of the associated consistency group(s), (5) is hidden from and not provided to a requesting computer when the computer reads the associated consistency group(s), and (6) can only be modified or accessed by the storage system. In other words, the ghost volume continues to exist only for internal usage of the storage system upon it being designated as a ghost volume.

In an embodiment, a ghost volume bit(s) associated with an address of the to-be deleted volume is set to active when the volume is designated as a ghost volume. In another embodiment, a ghost volume field within a data structure that tracks which to-be deleted volumes are designated as ghost volumes is set to active when an original volume is designated as a ghost volume.

For clarity, the pointer 230 within snapshot 330 that points to an a ghost volume may be referred herein as an to-be deleted volume 220.

Upon receipt of an instruction to delete an original volume from storage system 132, snapshot manager 205 may allow the immediate deletion of the original volume from storage system 132 if there are no snapshots 330 that contain a pointer 230 that points to the to-be deleted original volume or, alternatively, may delay or prevent the deletion of the to-be deleted volume by designating the to-be deleted original volumes as a ghost volume. The deletion of the ghost volume is delayed or prevented until there are no snapshots 330 that include a pointer 230 that points to the ghost volume. In other words, snapshot manager 205 delays or prevents the deletion of the ghost volume from storage system 132 until there are no to-be deleted volume 220$s$ within any snapshot 330 in the snapshot repository that point to the ghost volume.

For clarity, the term deleted from the storage system, or the like, is defined herein to be the result of a data deletion or a data erasure such that the deleted data becomes inaccessible to a requesting system that requests access to the data once deleted. Data deletion is the technique of removing necessary-pointers that are needed to access the block stored upon the storage device. By removing such necessary-pointers, the deleted data become inaccessible. As a result of data deletion, the data is maintained but hidden within the storage system 132. Data erasure is the technique of overwriting the data with a stream of zeros, ones, or meaningless pseudorandom data. By overwriting data, the deleted data become inaccessible.

As is exemplarily depicted in FIG. 6, original volume 220D and original volume 220I are designated to be deleted from storage system 132. As a result volume 220d and volume 220I are designated as ghost volume 220D' and ghost volume 220I'. In one embodiment, ghost volume 220D' and ghost volume 220I' are removed from any consistency group 300 that which they are associated upon their designations as ghost volumes, respectively. In another embodiment, ghost volume 220D' and ghost volume 220I' are maintained within one or more consistency group 300 that which they presently included, respectively.

As a result of the designation of original volume 220D and original volume 220I as ghost volume 220D' and ghost volume 220I', the pointer 230D and the pointer 230I that point to ghost volume 220D' and ghost volume 220I', respectively, within point-in-time snapshots 330A, 330B become to-be deleted volume 220s 230D' and 230I', respectively. The term to-be deleted volume 220, or the like, is defined herein to be a pointer within a snapshot that (1) is within a point-in-time snapshot that points to a ghost volume, (2) is usable to point to applicable data of the ghost volume even after the designation of the ghost volume, and (3) is deleted from the storage system upon when the ghost volume to which it points is deleted from the storage system.

Because of their designation as ghost volumes, ghost volume 220I' and ghost volume 220D' are (1) to-be deleted volumes from the storage system 132, (2) that are or was associated with consistency group(s) (e.g. consistency group 300A, 300B) that which snapshots 330 exist within storage system 132 that contain a pointer 230I' and 230D' that points to the ghost volume 220I' and ghost volume 220D', respectively, (3) are not deleted from the storage system 132 until there are no point-in-time snapshots 330 within the storage system 132 that contain a pointer 230I' and 230D' that points to the ghost volume 220I' and ghost volume 220D', (4) subsequent their designation as ghost volume 220I' and ghost volume 220D', are not snapped in future point-in-time snapshots 330 of the associated consistency group(s), and (5) are hidden from and not provided to a requesting computer 100 when the computer 100 reads the associated consistency group(s).

Because ghost volumes are maintained within storage system 132 subsequent to the associated deletion request of the volume, prior snapshots 330 that contain an to-be deleted volume 220 that points to the ghost volume may be utilized in data recovery operations because the snapshot remains a full (i.e. not partial) snapshot wherein all of the pointers that every existed within the snapshot point to accessible data within the storage system.

Figure 7:
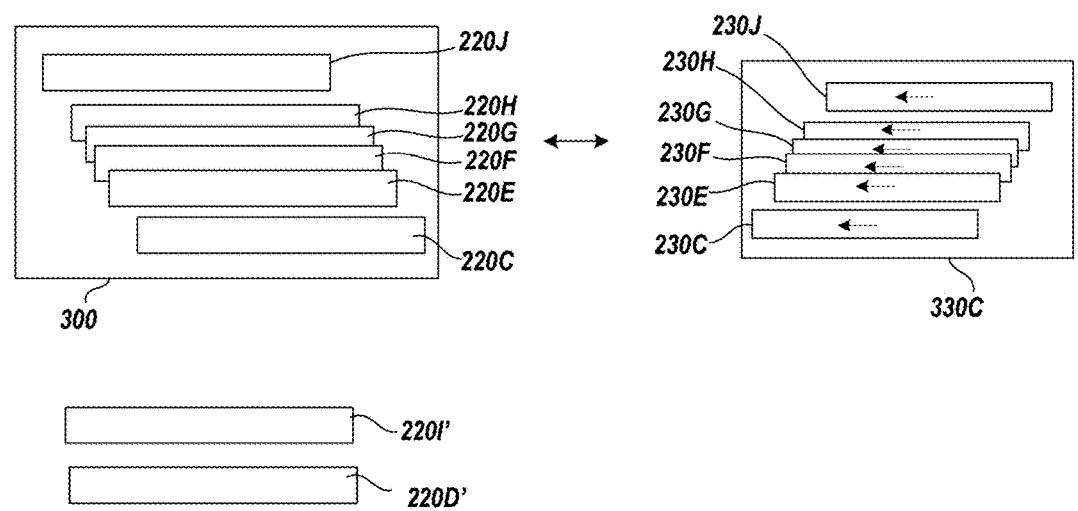
FIG. 7 illustrates ghost volumes within the storage system that are designated to be deleted and a snapshot of a consistency group that was previously associated with the ghost volume taken at a point-in-time subsequent to the existence of the ghost volumes, according to various embodiments of the present invention.

FIG. 7 illustrates consistency group 300, ghost volume 220D', and ghost volume 220I' within storage system 132 subsequent to the designation of ghost volume 220D' and ghost volume 220I'. Ghost volume 220D' and ghost volume 220I' were previously or are currently associated with consistency group 300. For example, ghost volume 220D' and ghost volume 220I' may be currently included within consistency group 300. Alternatively, as is depicted in FIG. 7. ghost volume 220D' and ghost volume 220I' were once previously included in consistency group 300 but are presently not included in consistency group 300.

Because of their designations as ghost volume 220D' and ghost volume 220I', a point-in-time snapshot 330C taken subsequent to the designation of ghost volume 220D' and ghost volume 220I', includes pointers 230C, 230E-230H, and 230J. Because ghost volume 220D' and ghost volume 220I' are not snapped in point-in-time snapshot 330C of the associated consistency group 300, point-in-time snapshot 330C does not include a pointer that points to ghost volume 220D' nor a pointer that points ghost volume 220I'. However, point-in-time snapshot 330C does include pointers 230C that points to original volume 220C, pointer 230E that points to original volume 220E, pointer 230F that points to original volume 220F, pointer 230G that points to original volume 220G, pointer 230H that points to original volume 220H, and pointer 230J that points to original volume 220J.

FIG. 8 illustrates an exemplary table 400 data structure that tracks a count of the number point-in-time snapshots 330 that which contain a pointer 230 that points to each associated original volume 220. In other words, the depicted exemplary table 400 may be utilized to track the number of pointers that exist within snapshots within the snapshot repository that point to each volume (i.e., both original volumes and ghost volumes) associated with one or more consistency groups within the consistency group repository. Such a data structure may be created prior to the designation of any ghost volume and updated upon every instance a snapshot 330 is taken of a consistency group 300, upon every instance a snapshot 330 is deleted, etc. As such, the count for each volume that tracks the number point-in-time snapshots 330 that which contain a pointer 230 that points to the volume may increase, be maintained, or decrease as appropriate (i.e. increased when a new snapshot is taken that has a pointer that points to the volume, maintained when a new snapshot is taken that has a pointer that points to the volume and replaced an existing snapshot that also has a pointer that points to the volume, and decreased when an existing snapshot that has a pointer that points to the volume is deleted).

For clarity, a similar data structure is contemplated that tracks the number of only to-be deleted volume 220s that exist within snapshots within the snapshot repository that point to each ghost volume that was or is associated with one or more consistency groups within the consistency group repository. Such a data structure may be created subsequent to the designation a ghost volume. At the time of designation of the ghost volume, the snapshot repository may be scanned to determine the number of snapshots 330 that contain an to-be deleted volume 220 that points to the ghost volume. Since no further snapshots are taken that would include a pointer to the ghost volume, the number of snapshots 330 that contain an to-be deleted volume 220 that points to the ghost volume will only decrease as those snapshots 330 are deleted from the snapshot repository.

The exemplary depicted table 400 may include a field 402 that identifies an current consistency group 300, a filed 403 that identifies a past consistency group 330, a field 404 that identifies an original volume 220 within the consistency group 300, a field 406 that identifies that the original volume 220 has been designated to be deleted from the consistency group 300, a field 407 that identifies whether the volume is a ghost volume, a field 408 that identifies the number of point-in-time snapshots 330 that contain a pointer 230 that points to the original volume 220, and/or a field 410 that identifies the point-in-time snapshot(s) 330 that contain a pointer 230 that points to the original volume 220.

In the example depicted in FIG. 8, an original consistency group 1a23x7 is shown having one active original volume (i.e. volume 3,920,303) contained therewithin and a ghost volume (i.e. 3,920,302) that was once included in the consistency group 1a23x7. Original volume 3,920,302 is designated to be deleted from storage system 132 and has been deemed a ghost volume within storage system 132. Original consistency group 1a23x7 has been snapped three instances, with one of the instances being after the volume 3,920,302 was designated as a ghost volume and thus not snapped, subsequent to such designation. Therefore, the number 2 is included in field 408 associated with volume 3,920,302 since there are two point-in-time snapshots that have a pointer that point to ghost volume 3,920,302. The number 3 is included in field 408 associated with original volume 3,920,303 since there are three point-in-time snapshots that have a pointer that point to original volume 3,920,303. The point-in-time snapshots that which contains a pointer that points to ghost volume 3,920,302 are identified as point-in-time snapshot R1732a and point-in-time snapshot R2934d. Likewise, the point-in-time snapshots that which contains a pointer that points to original volume 3,920,303 are identified as point-in-time snapshot R3630m, point-in-time snapshot R8872p, and point-in-time snapshot R5032z.

Though table 400 is shown in a table data structure, such information may be contained within another data structure type. Likewise, though the entries within the fields of table 400 are shown in human readable characters, the entries within the data structure may be computer readable.

Figure 9:
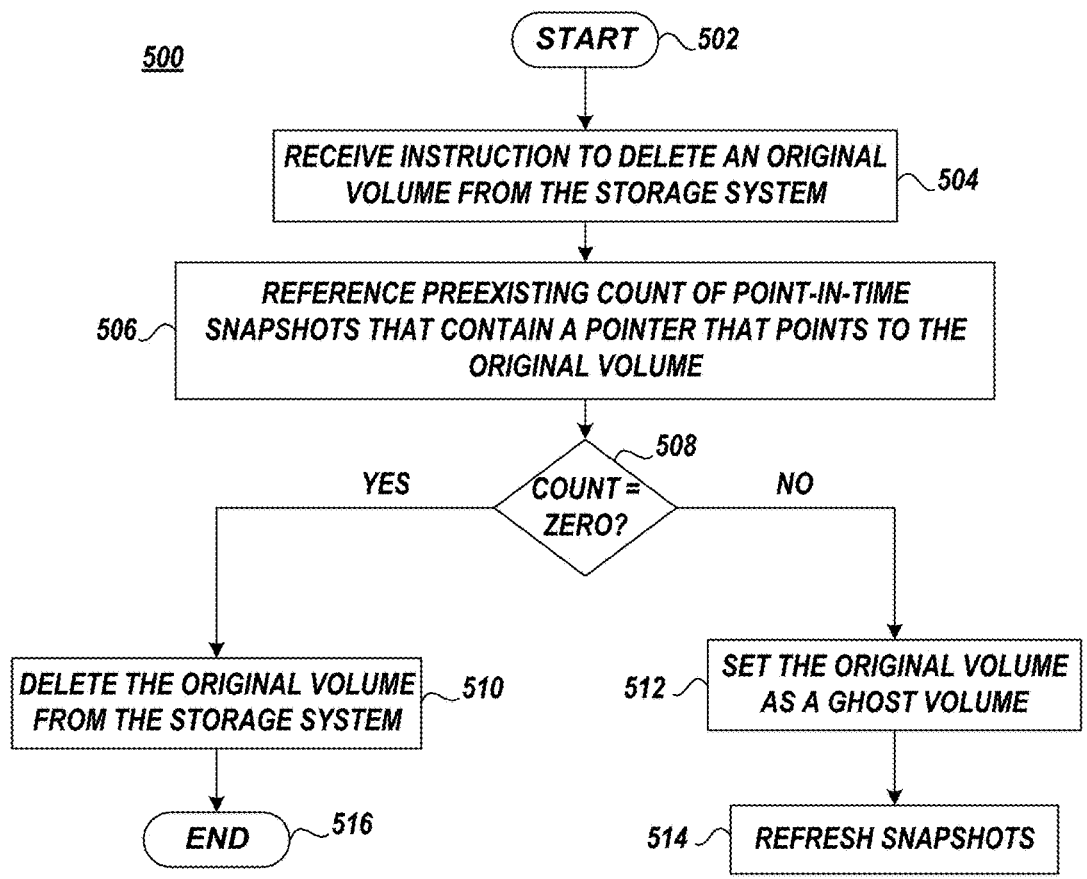
FIG. 9-FIG. 14 illustrate exemplary processes of managing a deletion of a volume referenced by a snapshot of a consistency group, according to various embodiments of the present invention.

FIG. 9 illustrates an exemplary process 500 of managing snapshots 330 of a consistency group 300 that includes a dynamic set of volumes. The term dynamic set of volumes is defined herein to be a set of original volumes that may each be designated as a ghost volume. Method 500 may be, for example, implemented by a storage system 132 that stores and returns data from and to computer 100. Method 500 is utilized in embodiments where a volume snapshot count is kept and maintained for volumes of a consistency group (e.g., original volumes and ghost volumes etc.). The volume snapshot count is on a per volume basis and is incremented when a snapshot is taken that includes a pointer that points to the volume, is decremented when a snapshot that includes a pointer that points to the volume is deleted, and is maintained when a previous snapshot that includes a pointer that points to the volume is replaced with a new snapshot that includes a pointer that points to the volume.

Upon the designation of a volume that was or is associated with a consistency group as a ghost volume, the volume snapshot count associated with the ghost volume is utilized to determine whether to immediately delete the ghost volume from the storage system (i.e. volume snapshot count is zero) or to delay or prevent the deletion of the ghost volume from the storage system (i.e. volume snapshot count is greater than zero).

Method 500 begins at block 502 and continues with receiving an instruction to delete an original volume 220 from the storage system 132. The volume associated with the deletion instruction may be referred herein as the to-be deleted volume 220. For example, storage system 132 receives the instruction from computer 100, storage controller 200 receives the instruction from computer 100, storage unit 202 receives the instruction from storage controller 200, or the like.

Method 500 continues with determining the number of point-in-time snapshots 330 that contain a pointer 230 that points to the to-be deleted volume 220 (block 506). For example, snapshot manager 205 determines that there are twenty point-in-time snapshots 330 that each contain a pointer 230 that points to the to-be deleted volume 220. Snapshot manager 205 snapshot manager 205 may query a data structure that tracks the number of point-in-time snapshots 330 that contain a pointer 230 associated with each original volume 220 within the storage system 132. For example, snapshot manager 205 may query field 408 of table data structure 400 that is associated the appropriate to-be deleted volume 220 to determine the number of point-in-time snapshots 330 that contain a pointer 230 that points to the to-be volume 220.

Method 500 continues with determining whether the number of point-in-time snapshots 330 that contain a pointer 230 that points to to-be deleted volume 220 is greater than zero (block 508). For clarity, the number of point-in-time snapshots 330 that contain a pointer 230 that points to to-be deleted volume 220 can be equal to or greater than zero. If the number of point-in-time snapshots 330 that contain a pointer 230 that points to to-be deleted volume 220 equals zero, method 500 continues to block 510 where the to-be deleted volume 220 is deleted from the storage system 132 and the pointer 230 that points to the to-be deleted volume 220 is resultantly deleted from each snapshot 330 that which it is contained, respectively. Following block 510 method 500 ends at block 516.

If the number of point-in-time snapshots 330 that contain a pointer 230 that points to the to-be deleted volume 220 is greater than zero, method 500 continues to block 512 where the to-be deleted volume 220 is set as a ghost volume (block 512). For example, snapshot manager 205 designates the to-be deleted volume 220 as a ghost volume so that it is not deleted from storage system 132 until there are no point-in-time snapshots 330 of the consistency group 300 that contain a pointer 230 that points to the to-be deleted volume. Method 500 may continue with taking subsequent point-in-time snapshots 330 and thereby refreshing the stock of snapshots 330 within the snapshot repository (block 514).

Figure 10:
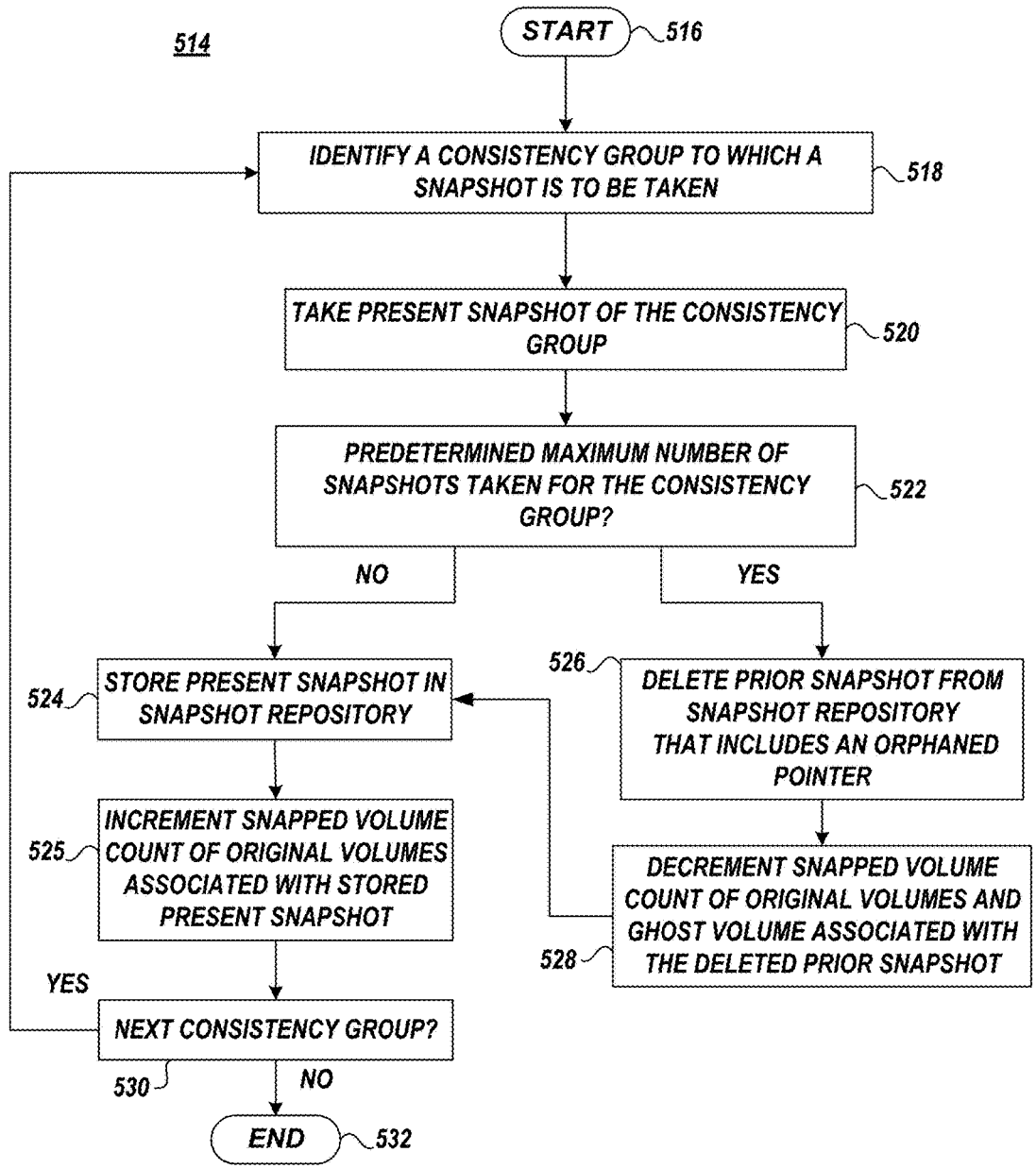

FIG. 10 illustrates an exemplary process 514 of refreshing the point-in-time snapshots 330 within the snapshot repository. Method 514 may be, for example, implemented by storage system 132, or the like. Method 514 is utilized to take point-in-time snapshots 330, subsequent to the designation of at least one ghost volume within storage system 132. Method 514 may be implemented such that, over time, the number of point-in-time snapshots 330 that which contain an orphaned pointer are reduced.

Method 514 begins at block 516 and continues with identifying a consistency group 300 to which a point-in-time snapshot 330 is to be taken (block 518). This consistency group 300 includes one or more original volumes 220 that are active (i.e. not designated as ghost volumes). Along with these one or more original active volumes 220, storage system 132 also includes at least one ghost volume that was previously or is currently associated with the consistency group 300 (e.g., within the consistency group 300, previously within the consistency group, etc.). Snapshot manager 205 may identify that a point-in-time snapshot 330 of a particular consistency group 300 is to be taken and stored in the snapshot repository.

Method 514 continues with taking a present point-in-time snapshot 330 of the consistency group 300 (block 520). The present point-in-time snapshot 330 taken of the particular consistency group 300 occurs subsequent to the designation of the ghost volume and, as such, the ghost volume is not snapped in the point-in-time snapshot 330.

Method 514 continues with determining whether a predetermined maximum number of point-in-time snapshots 330 have been taken of the consistency group 300 (block 522). For example, snapshot manager 205 may implement a snapshot scheme that collects only the latest two years of snapshots of the data of computer 100, may implement a snapshot scheme that creates only a finite number of point-in-time snapshots for each consistency group 300. Such schemes, therefore, are generally associated with a maximum number of point-in-time snapshots 330 being taken of consistency groups.

Method 514 continues with deleting a past point-in-time snapshot 330 from the snapshot repository that contains at least one orphaned pointer that points to the ghost volume, if the predetermined maximum number of point-in-time snapshots 330 have been taken of the consistency group 300 (block 526). The particular past point-in-time snapshot 330 that is deleted may be chosen by known arbitration schemes, such as first in first out, or the like. The particular past point-in-time snapshot 330 that is deleted may also contains active (i.e. non-orphaned) pointers that point to active original volumes within the consistency group 300 within the storage system 132.

Method 514 continues with decrementing the count of point-in-time snapshots 330 that an orphaned pointer that points to the ghost volume as a result of deleting the past point-in-time snapshot 330 from the snapshot repository (block 528). For example, snapshot manager 205 decrements the number contained within field 408 of table data structure 400 that indicates the count of point-in-time snapshots 330 that contain an orphaned pointer that points to each of the one or more ghost volumes as a result of deleting the past point-in-time snapshot 330 from the snapshot repository.

Method 514 continues with storing the point-in-time snapshot 330 in the snapshot repository, if the predetermined maximum number of point-in-time snapshots 330 have not been taken of the consistency group 300 (block 524). The stored point-in-time snapshot includes pointers 230 that point to each associated original volume 220 of the consistency group 330.

Method 514 continues with incrementing the count(s) of point-in-time snapshots 330 that contain pointer 230 that point to respective original volumes 220 of the consistency group 300, as a result of storing the current point-in-time snapshot 330 to the snapshot repository (block 525). For example, snapshot manager 205 increments the number contained within field 408 of table data structure 400 that indicates the count(s) of point-in-time snapshots 330 that contain a pointer 230 that points to each of the one or more original volumes 220 of the consistency group 300 as a result of storing the current point-in-time snapshot 330 to the snapshot repository.

Method 514 continues with determining whether there is a next consistency group 300 to which to take a point-in-time snapshot 330 (block 530). If there is a next consistency group 300 to which to take a point-in-time snapshot 330, method 514 returns to block 518 and if there is not a next consistency group 300 to which to take a point-in-time snapshot 330, method 514 ends at block 532.

Figure 11:
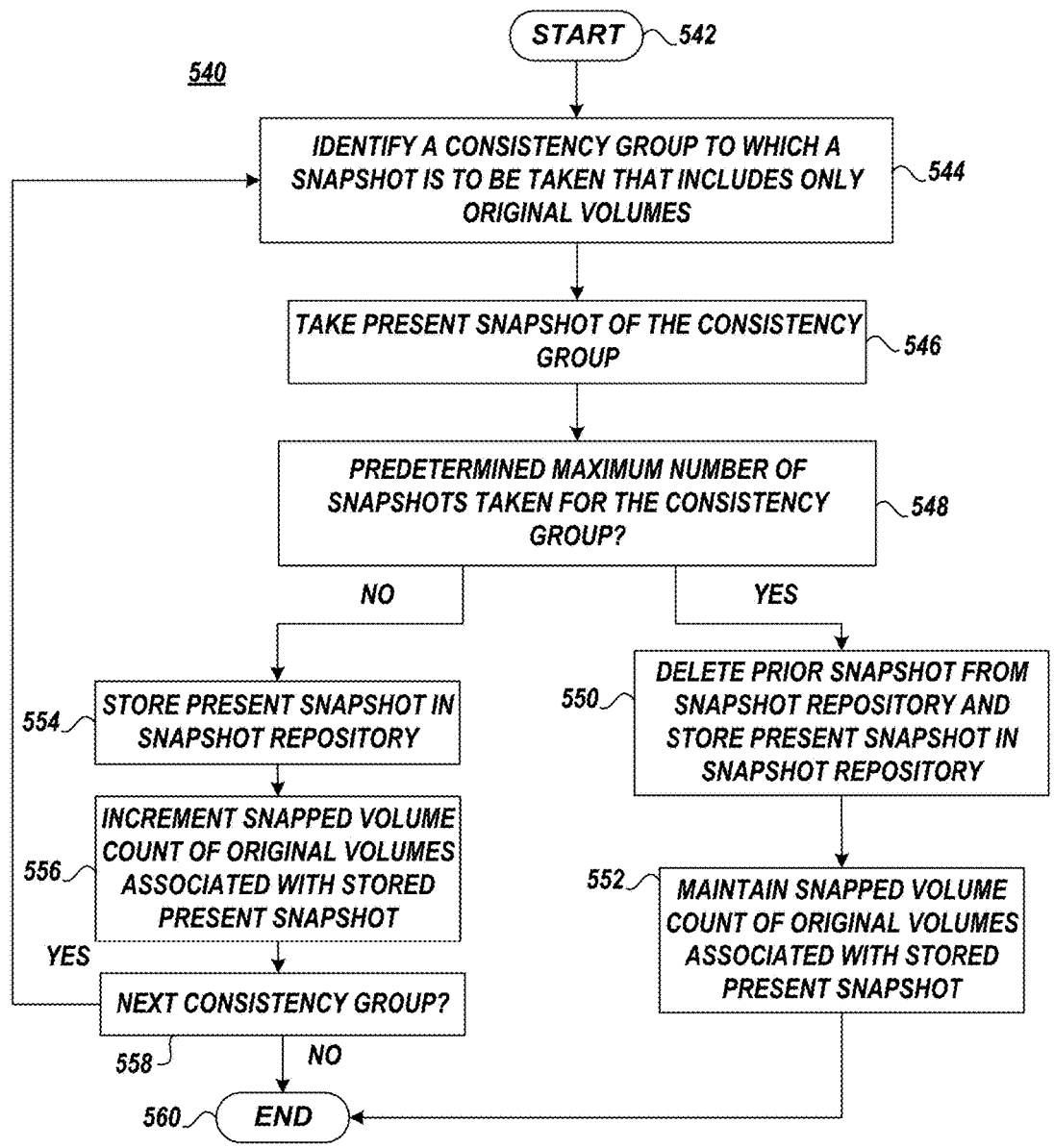

FIG. 11 illustrates an exemplary process 540 of taking a point-in-time snapshot 330 of a consistency group 300. Method 540 may be, for example, implemented by storage system 132, or the like. Method 540 is utilized to take point-in-time snapshots 330, prior to the designation of any ghost volume within storage system 132. Method 540 is associated with method 500 and is utilized in embodiments where a volume snapshot count is kept for volumes of a consistency group (e.g., original volumes, etc.) when snapshot(s) of the consistency group are taken. Method 540 may be utilized to increment or maintain the volume snapshot count for each original volume 220 when a new snapshot is taken. Upon the designation of a volume that was associated or is associated with a consistency group as a ghost volume, the volume snapshot count associated with the to-be deleted volume is utilized to determine whether to immediately delete the ghost volume from the storage system (i.e. volume snapshot count is zero) or to delay or prevent the deletion of the ghost volume from the storage system (i.e. volume snapshot count is greater than zero).

Method 540 begins at block 542 and continues with identifying a consistency group 300 to which a point-in-time snapshot 330 is to be taken (block 544). This consistency group 300 includes only one or more original volumes 220. Snapshot manager 205 may identify that a point-in-time snapshot 330 of a particular consistency group 300 is to be taken and stored in the snapshot repository.

Method 540 continues with taking a present point-in-time snapshot 330 of the consistency group 300 (block 546). The present point-in-time snapshot 330 taken of the particular consistency group 300 includes only one or more pointers that point to each one original volume 220 of the consistency group 300.

Method 540 continues with determining whether a predetermined maximum number of point-in-time snapshots 330 have been taken of the consistency group 300 (block 548). For example, snapshot manager 205 may implement a snapshot scheme that snaps only the latest two years of data of computer 100, may implement a snapshot scheme that creates only a finite number of point-in-time snapshots for each consistency group 300. Such schemes, therefore, are generally associated with a maximum number of point-in-time snapshots 330 being taken of the consistency group 300.

Method 540 continues with storing the point-in-time snapshot 330 in the snapshot repository, if the predetermined maximum number of point-in-time snapshots 330 have not been taken of the consistency group 300 (block 554). As the particular consistency group 300 does not include any ghost volumes, the present point-in-time snapshot 330 includes only pointers 230 that which each point to an active original volume 220 within the consistency group 300.

Method 540 continues with incrementing the count(s) of point-in-time snapshots 330 that contain pointer 230 that point to respective original volumes 220 of the consistency group 300, as a result of storing the current point-in-time snapshot 330 to the snapshot repository (block 556). For example, snapshot manager 205 increments the number contained within field 408 of table data structure 400 that indicates the count(s) of point-in-time snapshots 330 that contain pointers(s) 230 that each points one original volume 220 of the consistency group 300 as a result of storing the current point-in-time snapshot 330 to the snapshot repository.

Method 540 continues with determining whether there is a next consistency group 300 to which to take a point-in-time snapshot 330 (block 558). If there is a next consistency group 300 to which to take a point-in-time snapshot 330, method 540 returns to block 544 and if there is not a next consistency group 300 to which to take a point-in-time snapshot 330, method 540 ends at block 560.

Method 540 may continue with deleting a past point-in-time snapshot 330 from the snapshot repository and storing the present point-in-time snapshot to the repository, if the predetermined maximum number of point-in-time snapshots 330 have been taken of the consistency group 300 (block 550). The particular past point-in-time snapshot 330 that is deleted may be chosen by known arbitration schemes, such as first in first out, or the like. The past point-in-time snapshots 330 that may be deleted contains only pointers 230 that which each point to an active original volume 220 within the consistency group 300 and does not contain any orphaned pointers. As the present consistency group 300 stored to the repository does not include any ghost volumes, the present point-in-time snapshot 330 includes only pointers 230 that which each point to an active original volume 220 within the consistency group 300.

Method 540 continues with maintaining the count(s) of point-in-time snapshots 330 that contain pointer 230 that point to respective original volumes 220 of the consistency group 300, as a result of storing the current point-in-time snapshot 330 to the snapshot repository (block 552). Since the present snapshot 330 and the prior snapshot 330 both contain only pointers 230 that which each point to an active original volume 220 within the consistency group 300 and since the present snapshot essentially replaces the prior snapshot, there is no relative increase or decrees in the overall number of snapshots 330 that contain pointers 230 that point to original volumes 220 within consistency group 300. Method 540 may end at block 560.

Figure 12:
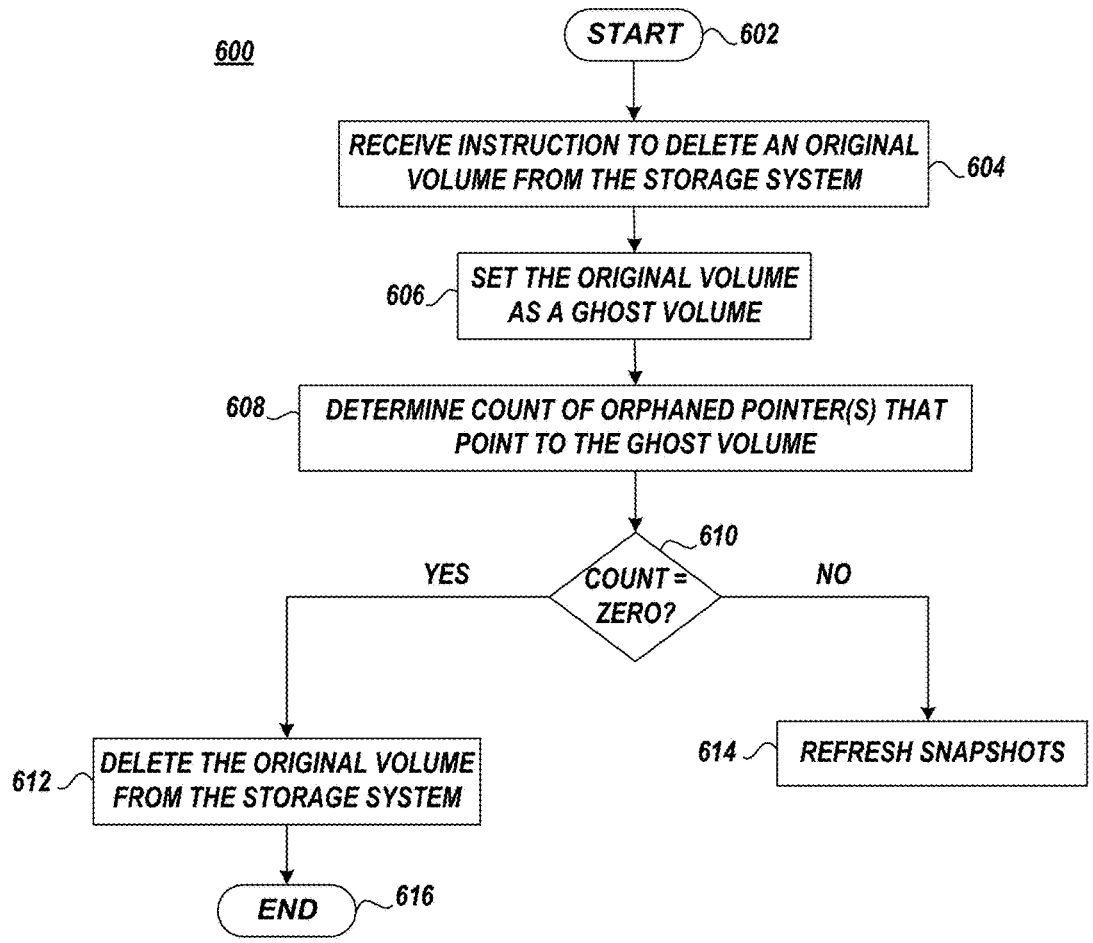

FIG. 12 illustrates an exemplary process 600 of managing snapshots 330 of a consistency group 300 that includes a dynamic set of volumes. Method 600 may be, for example, implemented by a storage system 132 that stores and returns data from and to computer 100. Method 600 is utilized in embodiments where an orphan pointer count or snapshot count which includes an orphan pointer, herein referred to as an orphaned pointer count, is determined subsequent to the designation of an associated ghost volume. Once such count is determined it may be stored and decreased as the snapshots that contain an orphaned pointer that points to the ghost volume are deleted. The orphan pointer count is utilized to determine whether to immediately delete the ghost volume from the storage system (i.e. count equals zero) or to delay or prevent the deletion of the ghost volume from the storage system (i.e. count is greater than zero).

Method 600 begins at block 602 and continues with receiving an instruction to delete an original volume 220 from the storage system 132. The volume associated with the deletion instruction may be further referred herein as the to-be deleted volume 220. For example, storage system 132 receives the instruction from computer 100, storage controller 200 receives the instruction from computer 100, storage unit 202 receives the instruction from storage controller 200, or the like.

Method 600 continues to block 612 where the to-be deleted volume 220 is set as a ghost volume (block 606). For example, snapshot manager 205 sets the to-be deleted volume 220 so that it is not deleted from storage system 132 until the orphaned pointer count associated with the to-be deleted volume 220 is zero.

Method 600 continues with determining the count of orphaned pointers that point to the ghost volume (block 608). For example, snapshot manager 205 scans the snapshots 300 within the snapshot repository and identifies each snapshot 300 that which contains an orphaned pointer that points to the to-be deleted volume 220. Each instance the snapshot manager 205 identifies a snapshot 300 that contains an orphaned pointer that points to the to-be deleted volume 220 the orphaned pointer count associated with the to-be deleted volume 220 is incremented.

If the number of orphaned pointers is greater than zero, the deletion of the ghost volume is prevented or delayed and method 600 continues with taking subsequent point-in-time snapshots 330 and thereby refreshing the stock of snapshots 330 within the snapshot repository (block 614).

Figure 13:
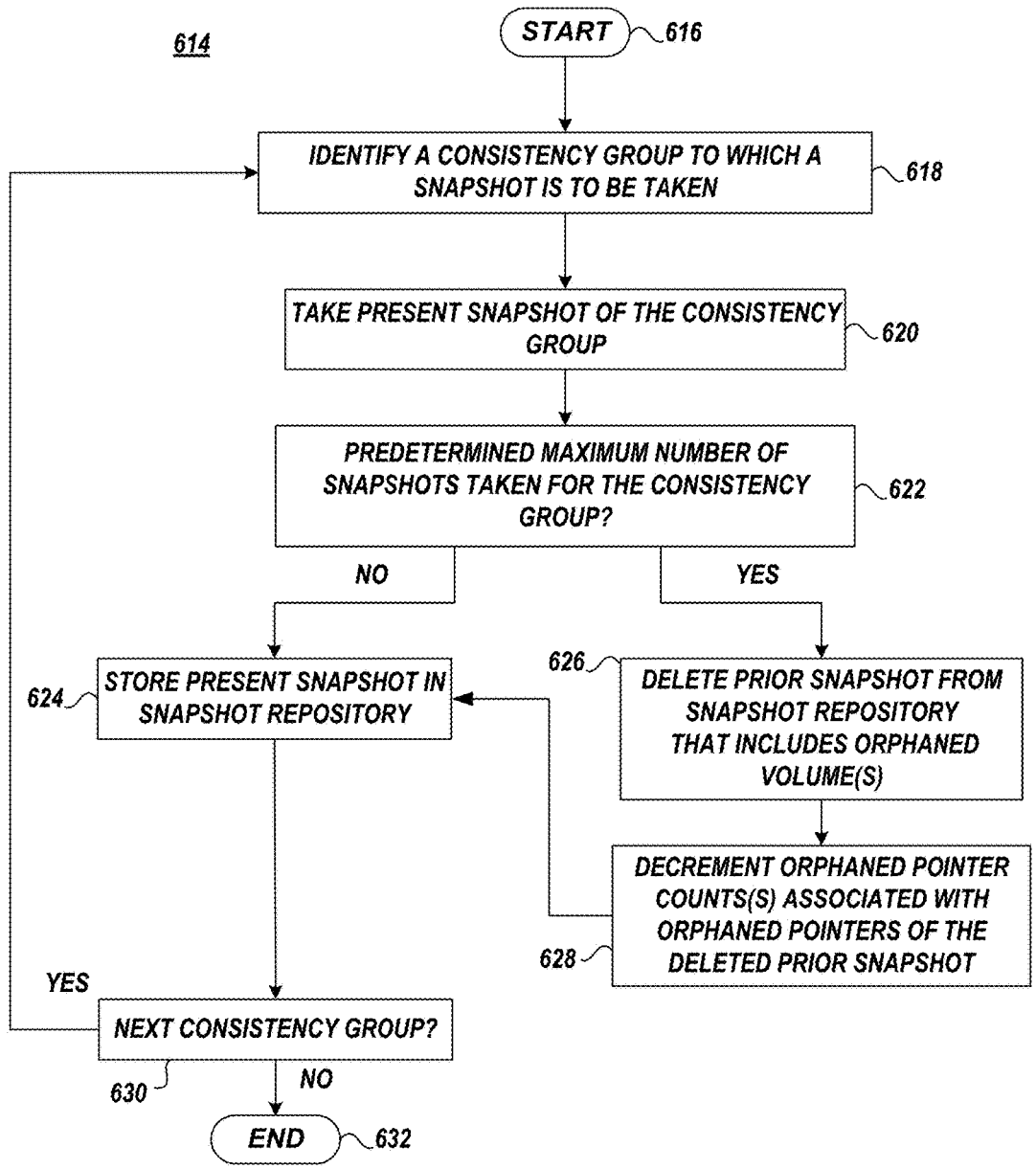

FIG. 13 illustrates an exemplary process 614 of refreshing point-in-time snapshots 330 within the snapshot repository. Method 614 may be, for example, implemented by storage system 132, or the like. Method 614 is utilized to take point-in-time snapshots 330, subsequent to the designation of at least one ghost volume within storage system 132. Method 614 may be implemented such that, over time, the number of point-in-time snapshots 330 that which contain an orphaned pointer are reduced.

Method 614 begins at block 616 and continues with identifying a consistency group 300 to which a point-in-time snapshot 330 is to be taken (block 618). This consistency group 300 includes one or more original volumes 220 that are active (i.e. not designated as ghost volumes). Along with these one or more original active volumes 220, storage system 132 also includes at least one ghost volume that was previously or is currently associated with the consistency group 300 (e.g., within the consistency group 300, previously within the consistency group, etc.).

Method 614 continues with taking a present point-in-time snapshot 330 of the consistency group 300 (block 620). The present point-in-time snapshot 330 taken of the particular consistency group 300 occurs subsequent to the designation of the associated ghost volume and, as such, the ghost volume is not snapped in the point-in-time snapshot 330.

Method 614 continues with determining whether a predetermined maximum number of point-in-time snapshots 330 have been taken of the consistency group 300 (block 622). Method 614 continues with deleting a past point-in-time snapshot 330 from the snapshot repository that contains at least one orphaned pointer that points to the associated ghost volume, if the predetermined maximum number of point-in-time snapshots 330 have been taken of the consistency group 300 (block 626). The particular past point-in-time snapshot 330 that is deleted may be chosen by known arbitration schemes, such as first in first out, or the like. The particular past point-in-time snapshot 330 that is deleted contains at least one orphaned pointer that points to the associated ghost volume. The particular past point-in-time snapshot 330 that is deleted may also contains active (i.e. non-orphaned) pointers associated with active original volumes within the storage system 132.

Method 614 continues with decrementing the orphaned pointer count associated with the deleted snapshot for the ghost volume as a result of deleting the past point-in-time snapshot 330 from the snapshot repository (block 628). Method 614 continues with storing the present point-in-time snapshot 330 in the snapshot repository, if the predetermined maximum number of point-in-time snapshots 330 have not been taken of the consistency group 300 (block 624). The stored present point-in-time snapshot includes pointers 230 that point to each associated original volume 220 of the consistency group 330.

Method 614 continues with determining whether there is a next consistency group 300 to which to take a point-in-time snapshot 330 (block 630). If there is a next consistency group 300 to which to take a point-in-time snapshot 330, method 614 returns to block 618 and if there is not a next consistency group 300 to which to take a point-in-time snapshot 330, method 614 ends at block 632.

Figure 14:
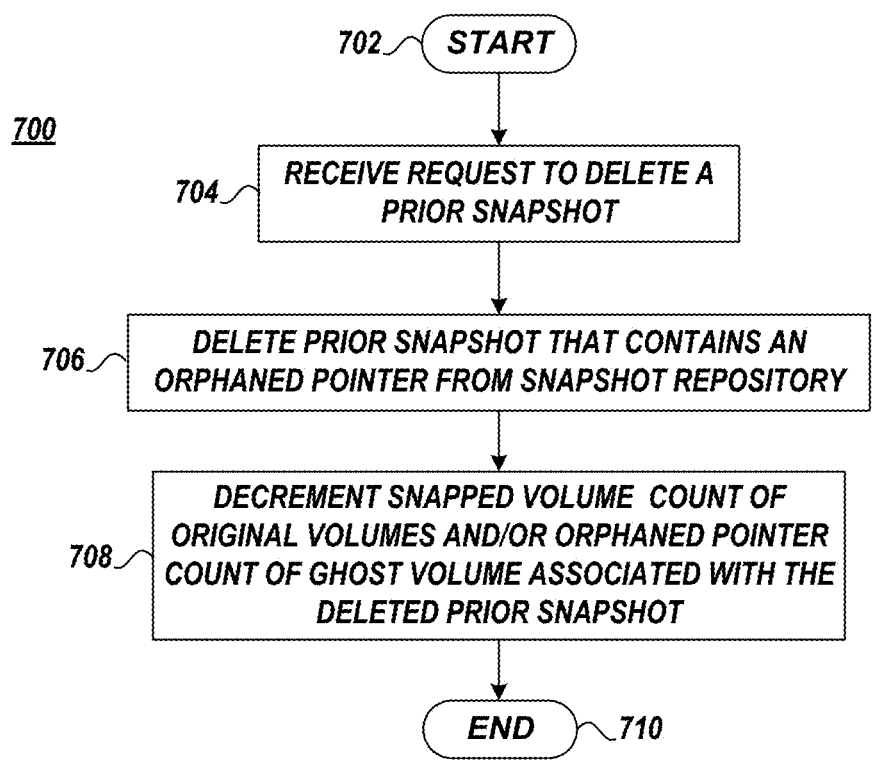

FIG. 14 illustrates an exemplary process 700 of deleting a snapshot 330 from the snapshot repository. Method 700 may be, for example, implemented by storage system 132, or the like. Method 700 is utilized to decrement the respective snapshot counts of each volume referenced by the deleted snapshot (e.g, see embodiment(s) of FIG. 9) and/or to decrement the orphaned volume count of each ghost volume referenced by the deleted snapshot (e.g., see embodiment(s) of FIG. 12). Method 700 may be implemented such that applicable snapshot counts that are associated with original volumes or that orphaned volume counts that are associated with ghost volumes are decremented upon the deletion of a snapshot 330.

Method 700 begins at block 702 and continues with receiving a request to delete a snapshot 330 (block 704). The snapshot 330 associated with the deletion instruction may be referred herein as the to-be deleted snapshot 330. For example, storage system 132 receives the instruction from computer 100, storage controller 200 receives the instruction from computer 100, storage unit 202 receives the instruction from storage controller 200, or the like.

Method 700 continues with delete the to-be deleted snapshot 330 that contains an orphaned pointer that points to a ghost volume from the snapshot repository (block 706). The to-be deleted snapshot 330 may also include pointers that point to one of the original volumes 220 of the consistency group 300 associated with the snapshot 330.

Method 700 continues with decrementing the snapped volume count of the original volume(s) and/or decrementing the orphaned volume count of the ghost volume(s) associated with the deleted snapshot 330. For example, if snapped volume count is kept and updated for each volume of a consistency group being snapped (e.g, see embodiment(s) of FIG. 9) then the snapped volume counts for each original volume 220 and any ghost volume associated with the consistency group 300 are decremented. Alternatively, if only the orphaned pointer count is kept and updated after the designation of the associated ghost volume (e.g, see embodiment(s) of FIG. 12), then only the orphaned pointer count(s) of the ghost volume(s) associated with the consistency group 300 that was snapped by the deleted snapshot 330 is decremented. Method 700 ends at block 710.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. A method of managing a deletion of volume referenced by a snapshot of a consistency group, the method comprising:
designating a to-be deleted original volume as a ghost volume within a consistency group stored within a storage system, the consistency group, subsequent to the designation of the ghost volume, comprising the ghost volume and a plurality of original volumes;
identifying a preexisting point-in-time snapshot of the consistency group that existed prior to the designation of the ghost volume, the preexisting point-in-time snapshot, subsequent to the designation of the ghost volume, comprising a plurality of pointers that each point to a different one of the plurality of original volumes of the consistency group and an orphaned pointer that points to the ghost volume;
subsequent to the designation of the ghost volume, taking a present point-in-time snapshot of the consistency group, the present point-in-time snapshot consisting of a plurality of pointers that each point to a different one of the plurality of original volumes of the consistency group; and preventing deletion of the ghost volume from the storage system until there are no point-in-time snapshots of the consistency group that comprise a orphaned pointer that points to the ghost volume.

2. The method of claim 1, further comprising:
receiving an instruction to delete the to-be deleted original volume from the storage system; and
deleting the preexisting point-in-time snapshot of the consistency group from the storage system.

3. The method of claim 1, wherein preventing deletion of the ghost volume from the storage system comprises:
determining a number of point-in-time snapshots of the consistency group that comprise a orphaned pointer that points to the ghost volume.

4. The method of claim 3, wherein determining the number of point-in-time snapshots of the consistency group that comprise an orphaned pointer that points to the ghost volume comprises:
incrementing applicable original volume snapshot count fields within a data structure when a point-in-time snapshot that comprises pointers that point to applicable original volumes is taken and stored within a snapshot repository; and
decrementing applicable original volume snapshot count fields within the data structure when a point-in-time snapshot that comprises pointers that point to applicable original volumes is deleted from the snapshot repository.

5. The method of claim 1, wherein designating the to-be deleted original volume as the ghost volume comprises:
setting a ghost volume bit associated with an address of the to-be deleted original volume to designate the to-be deleted original volume as the ghost volume.

6. The method of claim 1, wherein designating the to-be deleted original volume as the ghost volume comprises:
setting as active a ghost volume field within a data structure that tracks which original volumes are designated as ghost volumes to designate the to-be deleted original volume as the ghost volume.

7. The method of claim 1, wherein the ghost volume is:
a to-be deleted volume from the storage system;
that is or was associated with a consistency group that which snapshots exist within the storage system that contain a pointer that points to the to-be deleted volume;
is not deleted from the storage system until there are no point-in-time snapshots within the storage system that contain the pointer that points to the to-be deleted volume;
subsequent the designation as the ghost volume, is not snapped in future point-in-time snapshots of the associated consistency group;
is hidden from and not provided to a requesting computer when the computer reads the associated consistency group; and
is modifiable and accessible only by the storage system.

8. A computer program product for managing a deletion of a volume referenced by a snapshot of a consistency group, the computer program product comprising a computer readable storage medium having program instructions embodied therewith, the program instructions readable by a storage system to cause the storage system to:
designate a to-be deleted original volume as a ghost volume within a consistency group stored within the storage system, the consistency group, subsequent to the designation of the ghost volume, comprising the ghost volume and a plurality of original volumes;

identify a preexisting point-in-time snapshot of the consistency group that existed prior to the designation of the ghost volume, the preexisting point-in-time snapshot, subsequent to the designation of the ghost volume, comprising a plurality of pointers that each point to a different one of the plurality of original volumes of the consistency group and an orphaned pointer that points to the ghost volume;

subsequent to the designation of the ghost volume, take a present point-in-time snapshot of the consistency group, the present point-in-time snapshot consisting of a plurality of pointers that each point to a different one of the plurality of original volumes of the consistency group; and prevent deletion of the ghost volume from the storage system until there are no point-in-time snapshots of the consistency group that comprise a orphaned pointer that points to the ghost volume.

9. The computer program product of claim 8, wherein the program instructions are further readable by the storage system to cause the storage system to:

receive an instruction to delete the to-be deleted original volume from the storage system; and delete the preexisting point-in-time snapshot of the consistency group from the storage system.

10. The computer program product of claim 8, wherein the program instructions that cause the storage system to prevent deletion of the ghost volume from the storage system are further readable by the storage system to cause the storage system to:

determine a number of point-in-time snapshots of the consistency group that comprise a orphaned pointer that points to the ghost volume.

11. The computer program product of claim 10, wherein the program instructions that cause the storage system to determine the number of point-in-time snapshots of the consistency group that comprise the orphaned pointer that points to the ghost volume are further readable by the storage system to cause the storage system to:

increment applicable original volume snapshot count fields within a data structure when a point-in-time snapshot that comprises pointers that point to applicable original volumes is taken and stored within a snapshot repository; and decrement applicable original volume snapshot count fields within the data structure when a point-in-time snapshot that comprises pointers that point to applicable original volumes is deleted from the snapshot repository.

12. The computer program product of claim 8, wherein the program instructions that cause the storage system to designate the ghost volume are further readable by the storage system to cause the storage system to:

set a ghost volume bit associated with an address of the to-be deleted original volume to designate the to-be deleted original volume as the ghost volume.

13. The computer program product of claim 8, wherein the program instructions that cause the storage system to designate the ghost volume are further readable by the storage system to cause the storage system to:

set as active a ghost volume field within a data structure that tracks which original volumes are designated as ghost volumes to designate the to-be deleted original volume as the ghost volume.

14. The computer program product of claim 8, wherein the ghost volume is:

a to-be deleted volume from the storage system;

that is or was associated with a consistency group that which snapshots exist within the storage system that contain a pointer that points to the to-be deleted volume;

is not deleted from the storage system until there are no point-in-time snapshots within the storage system that contain the pointer that points to the to-be deleted volume;

subsequent the designation as the ghost volume, is not snapped in future point-in-time snapshots of the associated consistency group;

is hidden from and not provided to a requesting computer when the computer reads the associated consistency group; and is modifiable and accessible only by the storage system.

15. A storage system comprising:

a consistency group repository comprising a consistency group that comprises a plurality of original volumes and a designated ghost volume;

a snapshot repository comprising:

a first point-in-time snapshot of the consistency group taken prior to the designation of the ghost volume, the first point-in-time snapshot comprising a first plurality of pointers that each point to a different one of the plurality of original volumes and an orphaned pointer that points to the ghost volume;

a second point-in-time snapshot of the consistency group taken subsequent to the designation of the ghost volume, the second point-in-time snapshot consisting of a second plurality of pointers that each point to a different one of the plurality of original volumes; and a snapshot manager stored upon a computer readable storage medium within the storage system that when called by the storage system, causes the storage system to prevent deletion of the ghost volume from the storage system until there are no point-in-time snapshots of the consistency group that comprise a orphaned pointer that points to the ghost volume.

16. The storage system of claim 15, wherein the snapshot manager further allows the storage system to receive an instruction to delete an original volume from the storage system and wherein the snapshot manager further causes the storage system to delete the first point-in-time snapshot of the consistency group.

17. The storage system of claim 15, wherein the snapshot manager further causes the storage system to determine a number of point-in-time snapshots of the consistency group that comprise an orphaned pointer that points to the ghost volume.

18. The storage system of claim 15, wherein the snapshot manager further causes the storage system to increment applicable original volume snapshot count fields within a data structure when a point-in-time snapshot that comprises pointers that point to applicable original volumes is taken and stored within a snapshot repository; and to decrement applicable original volume snapshot count fields within the data structure when a point-in-time snapshot that comprises pointers that point to applicable original volumes is deleted from the snapshot repository.

19. The storage system of claim 15, wherein the snapshot manager further causes the storage system to set a ghost volume bit associated with an address of an original volume to active to designate the ghost volume.

20. The storage system of claim 15, wherein the ghost volume is:

a to-be deleted volume from the storage system;

that is or was associated with a consistency group that which snapshots exist within the storage system that contain a pointer that points to the to-be deleted volume;

is not deleted from the storage system until there are no point-in-time snapshots within the storage system that contain the pointer that points to the to-be deleted volume;

subsequent the designation as the ghost volume, is not snapped in future point-in-time snapshots of the associated consistency group;

is hidden from and not provided to a requesting computer when the computer reads the associated consistency group; and is modifiable and accessible only by the storage system.

* * * * *